United States Patent [19]

Reinhart

[11] Patent Number: 5,106,276
[45] Date of Patent: Apr. 21, 1992

[54] ELECTROHYDRAULIC METHOD AND APPARATUS

[76] Inventor: Lawrence W. Reinhart, 103 Raven Rd., Greenville, S.C. 29615

[21] Appl. No.: 710,236

[22] Filed: Jun. 3, 1991

Related U.S. Application Data

[60] Division of Ser. No. 541,482, Jun. 21, 1990, abandoned, which is a continuation of Ser. No. 166,887, Mar. 11, 1988, abandoned.

[51] Int. Cl.⁵ ............................................. F04B 35/02
[52] U.S. Cl. .................................. 417/416; 417/390
[58] Field of Search ............... 417/416, 417, 418, 62, 417/53, 534–537

[56] References Cited

U.S. PATENT DOCUMENTS

| | | | |
|---|---|---|---|
| 1,096,892 | 5/1914 | Danielsen | 417/417 X |
| 3,700,360 | 10/1972 | Shaddock | 417/390 X |
| 3,931,554 | 1/1976 | Spentzas | 417/418 X |
| 3,965,739 | 6/1976 | Jones | 73/861.05 |
| 3,984,745 | 10/1976 | Minalga | |
| 4,229,143 | 10/1980 | Pucher et al. | 417/383 |
| 4,243,899 | 1/1981 | Jaffe | |
| 4,274,823 | 6/1981 | Stanciu et al. | 425/145 |
| 4,353,220 | 10/1982 | Curwen et al. | 417/416 X |
| 4,439,698 | 3/1984 | Chen | |
| 4,518,317 | 5/1985 | Inoue | |
| 4,538,964 | 9/1985 | Brown | 417/418 X |
| 4,592,712 | 6/1986 | Gutjahr | |
| 4,592,713 | 6/1986 | Gutjahr | |
| 4,592,714 | 6/1986 | Gutjahr | |
| 4,599,063 | 7/1986 | Gutjahr | |
| 4,605,367 | 8/1986 | Gutjahr | |
| 4,631,430 | 12/1986 | Aubrecht | |
| 4,692,673 | 9/1987 | DeLong | 417/417 X |
| 4,696,160 | 9/1987 | Gat | 417/417 X |
| 4,712,027 | 12/1987 | Karidis | |
| 4,718,832 | 1/1988 | Takahashi | 417/62 X |
| 4,735,564 | 4/1988 | Sasaki et al. | 425/145 |
| 4,752,201 | 6/1988 | Kauffman et al. | 425/145 |
| 4,755,123 | 7/1988 | Otake | 425/145 |
| 4,895,505 | 1/1990 | Inaba et al. | 425/145 |
| 5,018,950 | 5/1991 | Reinhart | 417/383 |

FOREIGN PATENT DOCUMENTS

| | | | |
|---|---|---|---|
| 1044922 | 11/1953 | France | 417/418 |
| WO 8801562 | 3/1988 | PCT Int'l Appl. | |

Primary Examiner—Leonard E. Smith
Attorney, Agent, or Firm—Bailey & Hardaway

[57] ABSTRACT

An improved method and apparatus wherein hydraulic fluid movement is initiated by an electrical linear motor.

1 Claim, 4 Drawing Sheets

ELECTROHYDRAULIC METHOD AND APPARATUS

This application is a division of application Ser. No. 07/541,482, filed June 21, 1990, now abandoned which is a continuation of Ser. No. 07/166,887, filed Mar. 11, 1988, now abandoned.

BACKGROUND OF THE INVENTION

This invention relates generally to the art of hydraulics and, more particularly, to an improved method and apparatus for initiating the transfer of fluid power through hydraulic movement.

Conventionally, hydraulically operated apparati have relied upon rotary or circularly operated motors and pumps to initiate movement of hydraulic fluids so as to transmit motion and force from one location to another. Such transmission of motion and force conventionally is leveraged so as to intensify one or the other of the motion and force. Such laws of fluid power transfer are well known.

As used within this disclosure, the term "hydraulic movement" will be used to indicate the transfer of fluid power from one location to another through the movement of a hydraulic fluid. The term "fluid", of course, is utilized to mean any of the conventionally utilized oils, water, etc., as well as gases which may be utilized to transfer fluid power.

The rotary or circularly operated devices conventionally utilize to initiate such motion are noisy, cumbersome and require significant maintenance.

Disclosures of apparati involving hydraulically operated systems as they relate to injection molding are described for example in U.S. Pat. Nos. 4,592,712; 4,592,713; 4,592,714; 4,599,063; and 4,605,367.

While prior art systems have performed the function of producing hydraulic movement, the use of rotary or circularly operated motors and pumps makes them difficult to control and also requires the use of large reservoirs of such fluids and the corresponding disadvantages.

SUMMARY OF THE INVENTION

It is thus an object of this invention to provide a novel apparatus which initiates hydraulic movement by a means not heretofore utilized.

It is a further object of this invention to provide a novel method and apparatus which significantly simplifies and improves the initiation and control of fluid power.

It is a further and more particular object of this invention to provide such a novel method and apparatus which minimizes many of the disadvantages which heretofore existed.

These, as well as other objects, are accomplished by an improved method and apparatus wherein hydraulic fluid movement is initiated by an electrical linear motor.

DETAILED DESCRIPTION

In accordance with this invention, it has been found that an electrical linear motor may be utilized to initiate hydraulic flow and eliminate a number of the disadvantageous features associated with prior art apparati. The use of such linear motors to initiate hydraulic movement has been found to have the following advantages over the prior art rotary or circularly operated motors or pumps:

1. silent operation;
2. energy conservation;
3. instantaneous pressure on demand (no delays which are typically caused by spool motion in conventional relief valves);
4. high degree of control and modulation without complex valve assemblies;
5. simplified hydraulic circuits;
6. elimination of bulky hydraulic reservoirs;
7. reduction in reservoir and fluid volumes permits more economical use of more expensive and higher quality hydraulic fluids;
8. extremely high fluid pressure intensification and high velocity of hydraulic fluid;
9. elimination of hydraulic shock; and digital electronic readouts which display results of hydraulic pressure as a function of linear motor voltage.

As used within this disclosure the term "linear motor" is meant to include both alternating current and direct current linear motors. Such linear motors have been in existence for a number of years with U.S. Pat. No. 3,984,745 of the Singer Company being one of the first such motors.

Additionally, other linear motors are described in the following U.S. Pat. Nos. 4,243,899; 4,439,698; 4,518,317; 4,631,430 and 4,712,027, the disclosures of which are hereby incorporated by reference. A variety of linear motors are available from the Anorad Corporation of Hauppauge, N.Y.

Various other advantages and features of this invention will become apparent from a reading of the following description given with reference to the various figures of drawings.

Figure 1:
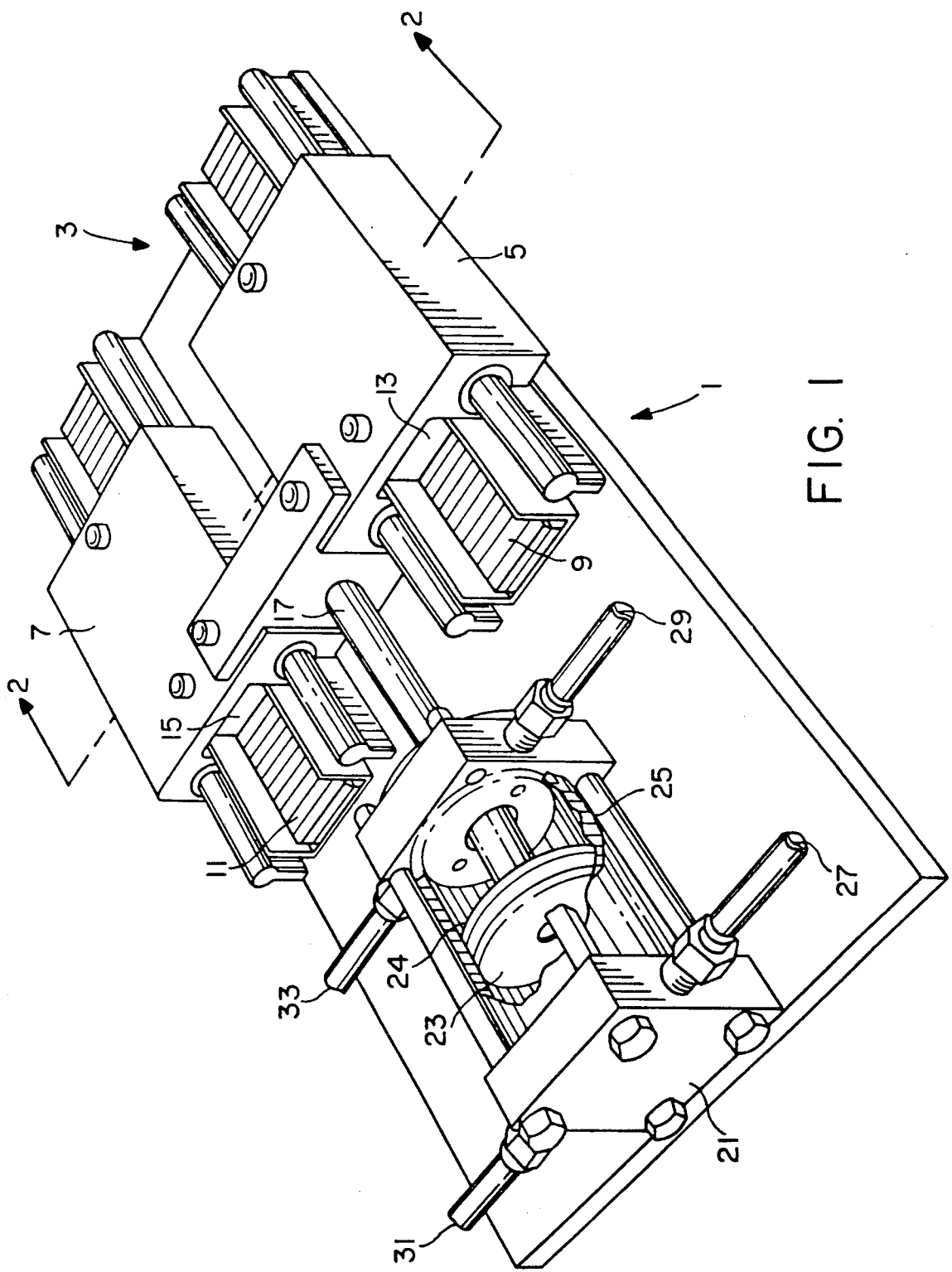
FIG. 1 is a perspective view of an apparatus in accordance with this invention.

FIG. 1 of the drawings illustrates an apparatus 1 in accordance with this invention wherein a linear motor assembly illustrated herein as 3 having a pair of linear motors 5 and 7 with each linear motor having a typical magnetic assembly bed 9 and 11 with a moving coil assembly 13 and 15. The linear motor assembly 3 is in communication with a piston rod 17 which transmits force from the linear motor assembly 3 to the hydraulic assembly 21. The piston rod 17 thus communicates with a hydraulic piston 23 within a hydraulic cylinder 24 defined by means 25.

The hydraulic assembly 21 includes a pair of inlets 27 and 29 and a pair of outlets 31 and 33. The inlets and outlets have one-way valves as will be further understood as the description proceeds such that as the piston 23 reciprocates due to the motion imparted thereto by piston rod 17, fluid on one side of the piston is pumped out of an outlet 31 or 33 and replenished on the other side thereof by movement of a fluid through the inlets 27 or 29.

Figure 2:
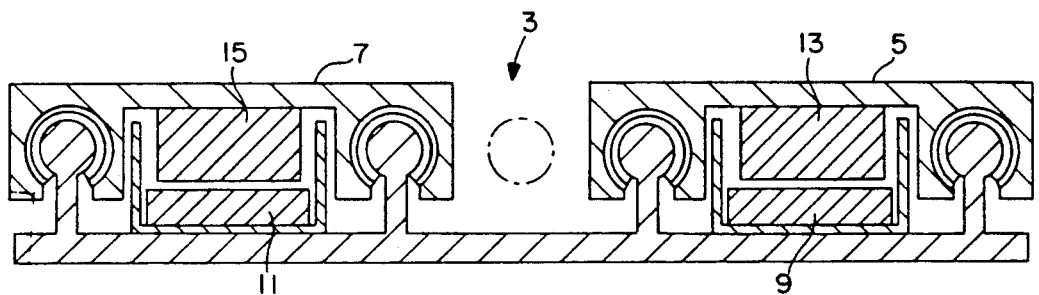
FIG. 2 is a view along line 2—2 of FIG. 1.

FIG. 2 of the drawings is a cross-section view along the line 2—2 of FIG. 1 which aids in understanding the positioning of the linear motor assembly 3. While FIG. 1 of the drawings as exemplified in the FIG. 2 cross-sectional view essentially describes the improved apparatus and method of this invention, various other embodiments and applications are involved.

Figure 3:
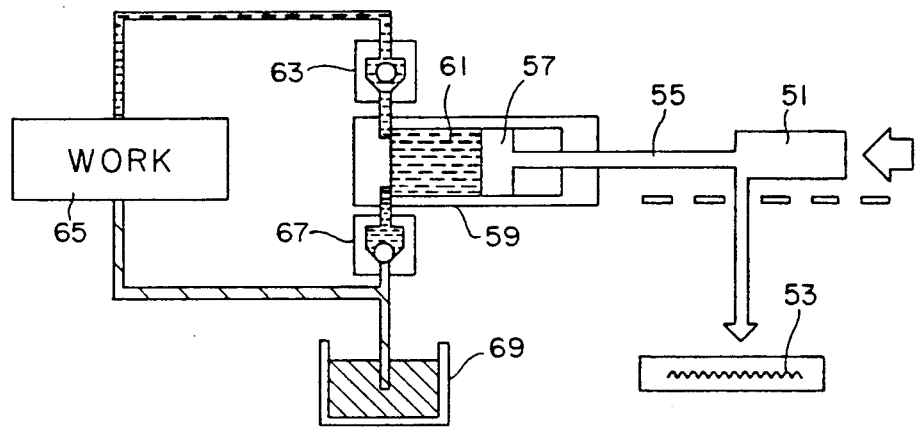
FIG. 3 is a schematic view of the device.

Such an embodiment is illustrated in FIG. 3 wherein a linear motor 51 having a tracking mechanism 53 as is well known in the art associated therewith is in communication through a piston rod 55 with a hydraulic piston 57 within means defining a hydraulic cylinder 59. It is seen that upon movement of hydraulic piston 57 to the left in FIG. 3, fluid illustrated herein as 61 moves out through outlet valve 63 to perform work at station 65. Upon retraction of piston 57 to the right of the FIG. 3 view, fluid is replenished through one-way valve 67 which is in communication with a reservoir 69. Additionally, as the hydraulic circuit is described depending on the type of work occurring at station 65, fluid may also be replenished from the work station itself.

Figure 4:
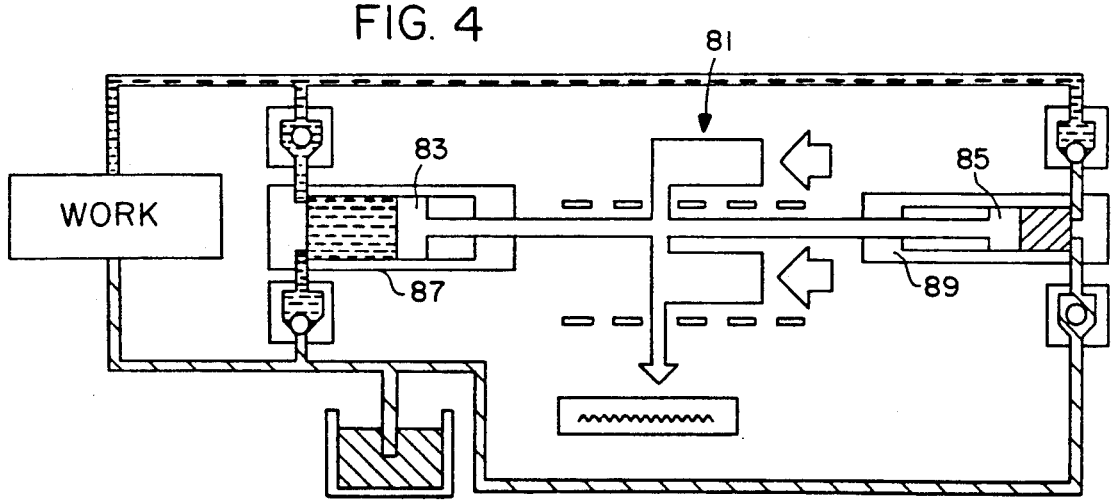
FIG. 4 is a schematic view of another embodiment of this invention wherein semi-continuous fluid flow is achieved.

FIG. 4 represents an additional embodiment wherein semi-continuous motion may be provided. It is seen that a linear motor assembly 81 which may be similar to the assembly of FIG. 1 is in communication with a pair of hydraulic pistons 83 and 85 such that upon movement in one direction of the linear motor will provide the movement of hydraulic fluid out of one piston while drawing hydraulic fluid into the other piston. Upon reversing of the movement of the linear motor assembly, the reverse will occur. As illustrated here, there are two hydraulic cylinders 87 and 89 of unequal volume. The utilization of this aspect will become apparent when a description is given with regard to FIG. 7 infra.

Figure 5:
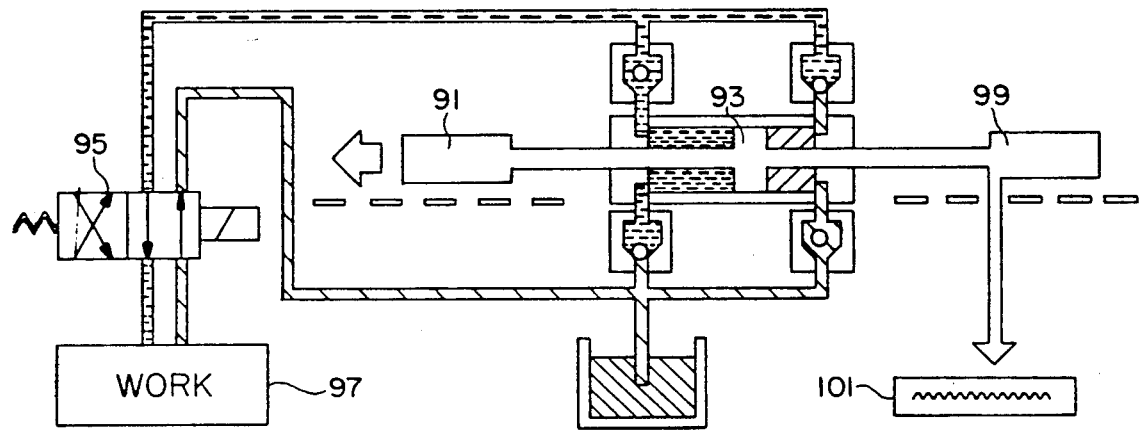
FIG. 5 is a schematic view of yet another apparatus in accordance with this invention wherein a semi-continuous hydraulic fluid flow is achieved.

FIG. 5 of the drawings is yet another embodiment wherein a linear motor assembly 91 communicates with a piston 93 in a manner similar to that indicated in FIG. 1. The FIG. 5 embodiment illustrates typical valving 95 associated with a work station 97. The FIG. 5 embodiment discloses a second linear motor assembly such as 99 which is in combination with a position detection apparatus 101. It is readily apparent that the position detection apparatus may be part of a closed loop control system such as that described in U.S. Pat. No. 4,243,899 incorporated by reference above.

Figure 6:
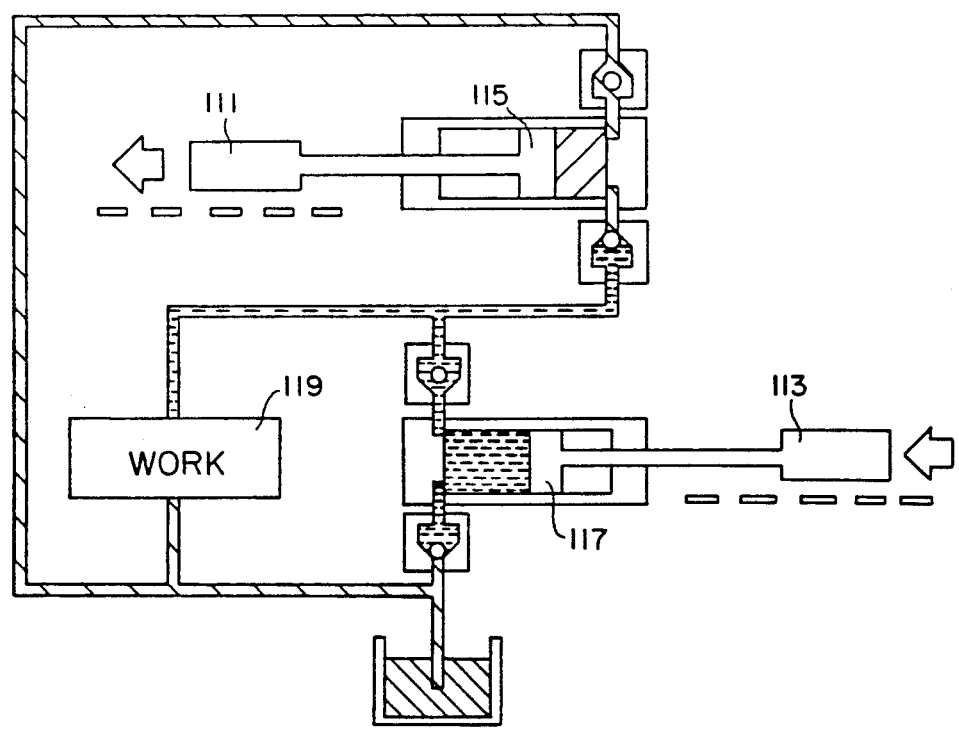
FIG. 6 schematically illustrates another embodiment wherein a continuous fluid flow is achieved.

FIG. 6 of the drawings illustrates an electrohydraulic system which provides for continuous fluid movement. As illustrated therein, separate linear motor assemblies 111 and 113 cooperate respectively with hydraulic pistons 115 and 117. It is noted that the piston locations are out of phase with one another such that continuous fluid movement upon continuing operation of linear motor assemblies 111 and 113 thus provide fluid movement at work station 119.

Figure 7:
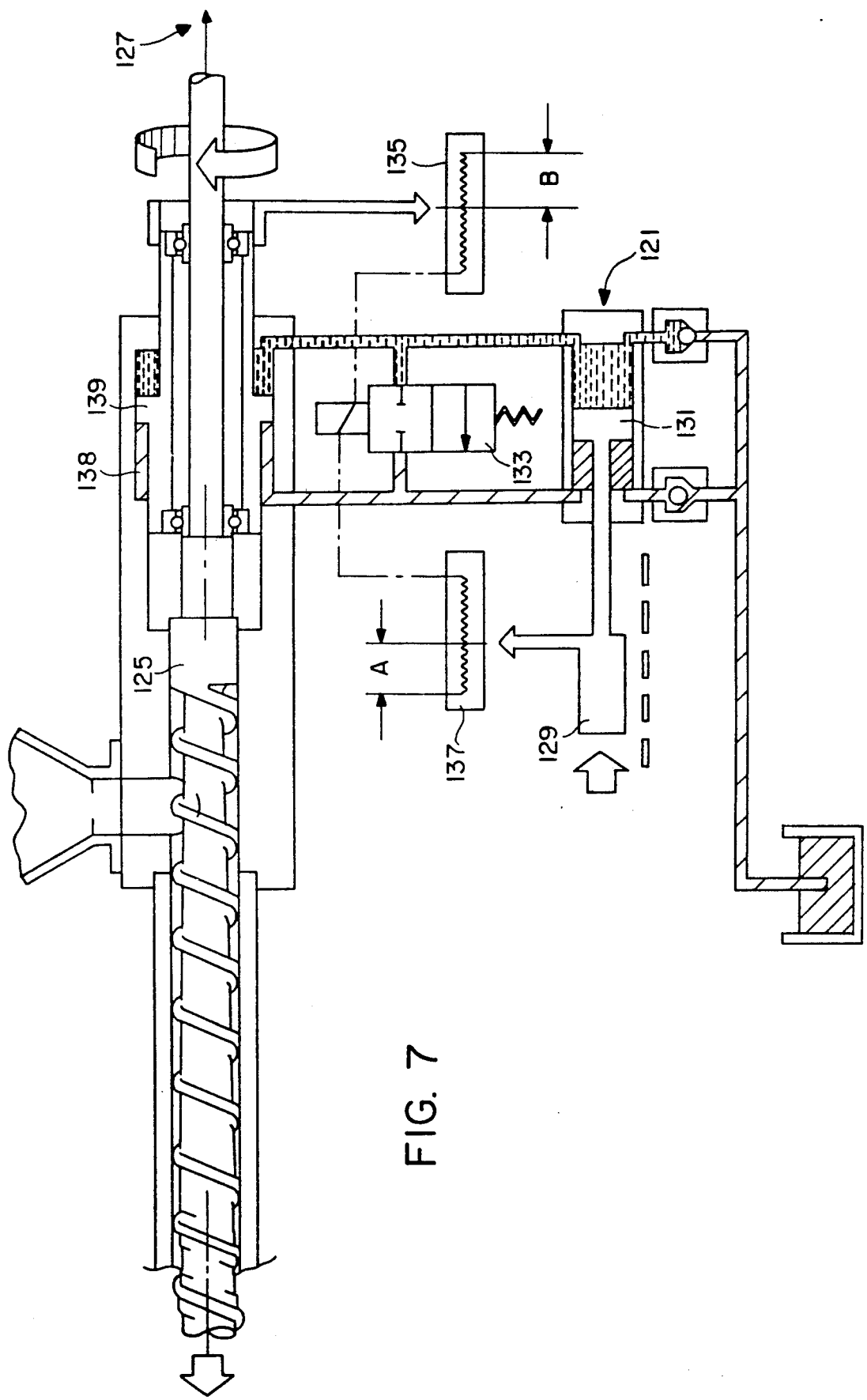
FIG. 7 schematically illustrates the improvement of this invention as applied to an injection molding apparatus.

FIG. 7 of the drawings illustrates the electrohydraulic system 121 of this invention in association with a plasticizing screw 125 utilized in an injection molding operation. As is well known, such plasticizing screws are displaced in the direction of arrow 127 by melted resin processed by the screw. The screw is moved to the left in the opposite direction of arrow 127 when melted resin is injected into the mold (not shown). As shown here, movement is hydraulically achieved by utilization of linear motor assembly 129 in association with a hydraulic piston 131. It is noted that the valving 133 and position indicating means 135 for the screw and 137 for the linear motor 129 permit relative position communication and subsequent correction. Such an assembly is simpler, more economical and quieter than was heretofore available in the prior art hydraulic systems.

Also noted in this particular illustration is the concept of controlled force for enhanced positioning accuracy by which the exhausting fluid from cylinder 138 is not permitted to return freely to the reservoir, but is controlled by the position of piston 131. Pistons 139 and 131 have sympathetic motion with regard to one another.

The improved hydraulic apparatus and method of this invention lends itself not only to the specific application identified above with regard to injection molding but is useful in virtually all applications of hydraulics. Examples would include silent fluid power aboard submarines or utilization within biochemical pumps.

It is thus seen that the improved method and apparatus of this invention provides many advantages over the prior art systems. It also provides a simple hydraulic circuitry, immediately available hydraulic fluid, precise control of hydraulic movement with silence and significantly less hydraulic fluid reservoir requirements. As the above description is exemplary in nature, being merely illustrative of this invention, many variations will become apparent to those of skill in the art. Such variations, however, are included within the spirit and scope of this invention as defined by the following appended claims.

I claim:

1. A hydraulically operated apparatus wherein hydraulic fluid is utilized to transmit motion from one location to another, comprising:

a linearly movable component;

hydraulic means in communication with said linearly movable component for imparting linear movement thereto;

an electric linear motor for causing movement of said hydraulic means and thereby linear movement of said linearly movable components;

said electric linear motor communicating with said hydraulic means on the exterior thereof;

said hydraulic means including:

a first hydraulic piston and cylinder in communication with said electric linear motor;

a second hydraulic piston and cylinder in hydraulic communication with said first hydraulic cylinder, said second hydraulic cylinder being in communication with said linearly movable component, said first and second hydraulic pistons and cylinders being in sympathetic association with one another whereby the location of one piston along its said stroke and thus the location of said linearly movable component along its stroke whereby the position of said linearly movable component can be accurately determined by the position of said electric linear motor along its stroke.

* * * * *